UNITED STATES PATENT OFFICE.

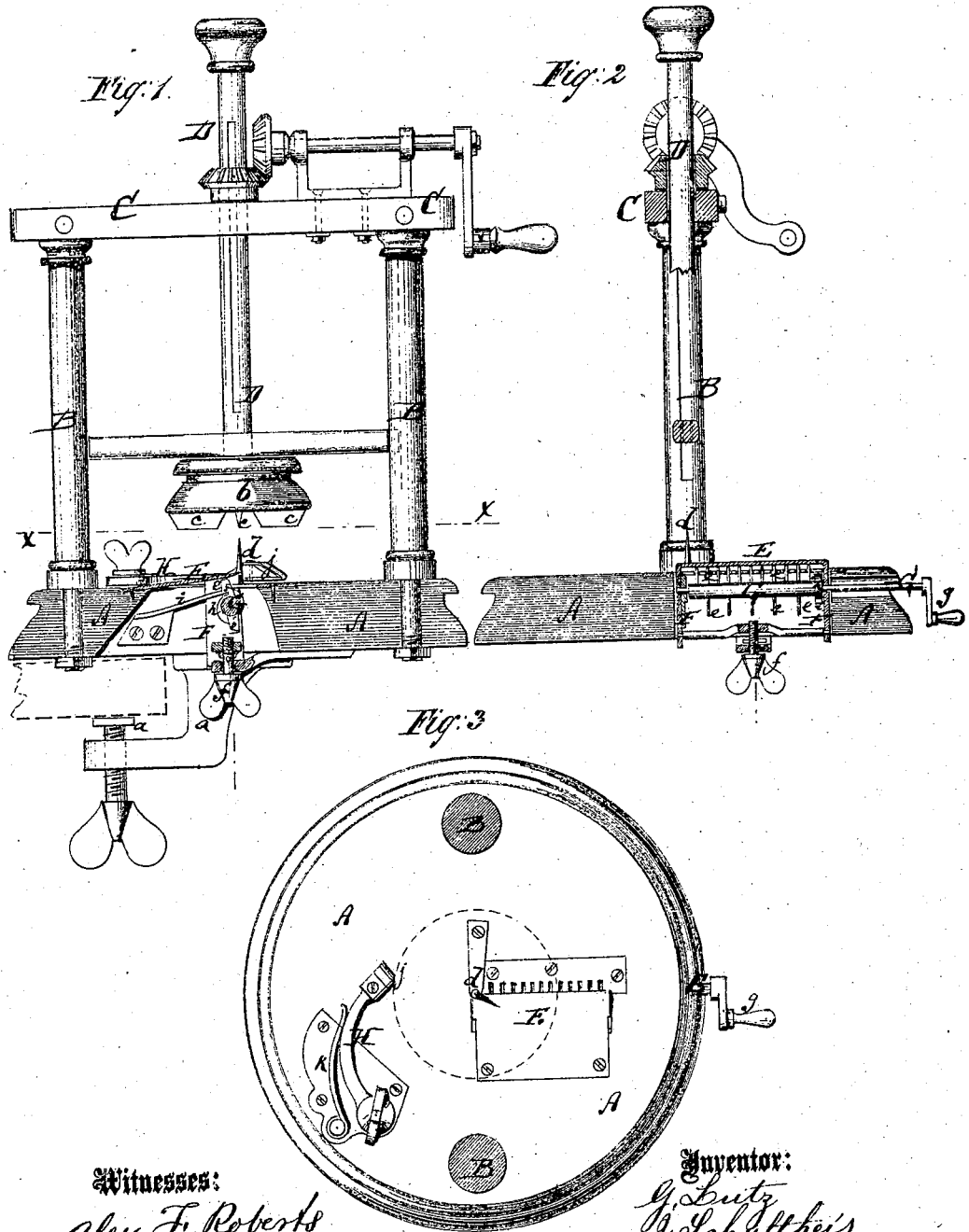

GEORG LUTZ, JOHN SCHULTHEIS, AND MICHEL FLORENTIN, OF NEWARK, NEW JERSEY.

Letters Patent No. 100,049, dated February 22, 1870.

IMPROVEMENT IN VEGETABLE-CUTTER.

The Schedule referred to in these Letters Patent and making part of the same.

*To all whom it may concern:*

Be it known that we, GEORG LUTZ, JOHN SCHULTHEIS, and MICHEL FLORENTIN, of Newark, in the county of Essex, and State of New Jersey, have invented a new and improved Vegetable-Cutter and Peeler; and we do hereby declare that the following is a full, clear, and exact description thereof, which will enable others skilled in the art to make and use the same, reference being had to the accompanying drawings forming part of this specification, in which—

Figure 1 represents a side view, partly in section, of our improved vegetable-cutter and peeler.

Figure 2 is a vertical transverse section of the same.

Figure 3 is a horizontal section of the same, taken on the plane of the line *x x*, fig. 1.

Similar letters of reference indicate corresponding parts.

This invention relates to vegetable-cutters and peelers, and consists in certain improvements thereon, which will be specified hereinafter.

A, in the drawing, represents the supporting-plate of the apparatus.

It is, by a screw-clamp, *a*, or other equivalent apparatus, secured to a table or other device.

From the plate project upward vertical posts B B, which carry a cross-piece, C, in which the vertical operating-shaft D is secured.

This shaft can rotate, and can also be vertically adjusted, and carries at its lower end a disk, *b*, and on that the detaining-blades *c*, as shown.

All these parts are not claimed by us, nor the devices for imparting rotary motion to the shaft, which may be gear-wheels, as shown, or a crank or other apparatus.

From the plate A projects centrally under the shaft D a pin, *d*, upon which the fruit is secured, and on which it is revolved by the shaft.

The fruit is sliced when revolved by a horizontal knife, E, which is secured somewhat above the surface of the plate A.

The slices are, by transverse knives *e*, cut into numbers of strips.

The knife E is secured to or connected with a frame, F, which extends downward through a slot of the plate A, and which is connected with a screw, *f*, whereby the cutting-edge of the knife can, with said frame, be adjusted higher or lower to regulate the thickness of the slices.

The cutters *e e* are secured to a shaft, G, which has its bearings in the frame F, and which extends from the plate A, and carries a crank, *g*, to be readily turned.

Two or more rows or series of such cutters are secured to different sides of the shaft, and each row contains a different number of cutters. Thus, by bringing either one or the other of the rows under the cutting-edge of the knife E, can each slice be cut into a suitable number of strips.

A cam, *h*, on the shaft G, and a spring, *i*, on the plate A, retain and hold the shaft G in the required position whatever row of cutters may be in operation.

To the surface of the plate A is pivoted a lever, H, which, at its free end, carries an inclined planing-knife, *j*, guarded by upright ears of the lever.

A spring, *k*, forces the said lever and knife against the side of the fruit to be cut, and causes thereby the knife *j* to nicely and properly peel such fruit as it is gradually cut and forced down by pressure upon the shaft D.

Having thus described our invention,

We claim as new and desire to secure by Letters Patent—

1. The peeling-knife *j*, attached to the lever H, and held by a spring against the side of the fruit, substantially as and for the purpose herein shown and described.

2. The cutters *e e*, arranged in two or more rows upon a shaft, G, the several rows containing different numbers of cutters to regulate the width of strips to be cut, as set forth.

3. The combination of the vertically-adjustable knife E, frame F, and screw *f*, with the cutters *e*, which are secured in several rows upon the shaft G, all arranged as set forth.

GEORG LUTZ.
JOHN SCHULTHEIS.
MICHEL FLORENTIN.

Witnesses:
GEO. W. MABEE,
ALEX. F. ROBERTS.